J. J. SAMMONS.
NUT LOCK.
APPLICATION FILED JAN. 8, 1921.

1,406,161.  Patented Feb. 7, 1922.

J. J. Sammons, Inventor
By Samuel Herrick,
Attorney

UNITED STATES PATENT OFFICE.

JOHN J. SAMMONS, OF AMARILLO, TEXAS.

NUT LOCK.

1,406,161. Specification of Letters Patent. Patented Feb. 7, 1922.

Application filed January 8, 1921. Serial No. 435,784.

*To all whom it may concern:*

Be it known that I, JOHN J. SAMMONS, a citizen of the United States of America, residing at 404 Polk Street, Amarillo, in the county of Potter and State of Texas, have invented certain new and useful Improvements in Nut Locks, of which the following is a specification.

This invention relates to nut locks and it has for its object to provide a device of this nature capable of economical construction and which will serve to securely hold a nut against reverse movement after it has once been screwed into position upon a bolt and wherein the nut be readily released for such reverse movement if for any reason it is desired to remove the nut from the bolt.

Further objects and advantages of the invention will be set forth in the detailed description which follows.

In the accompanying drawing.

Like numerals designate corresponding parts throughout the several figures of the drawing.

Figure 1:
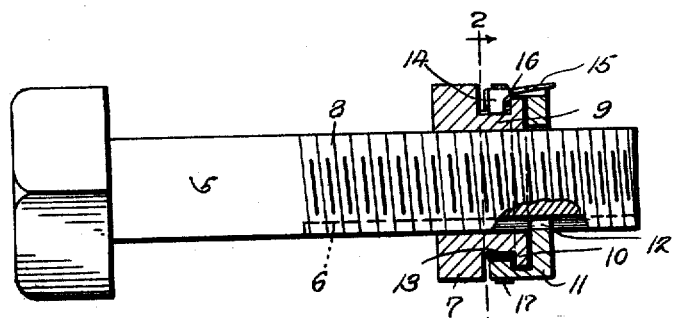
Figure 1 is a longitudinal sectional view through a nut and bolt constructed in accordance with the invention.
Figure 2:
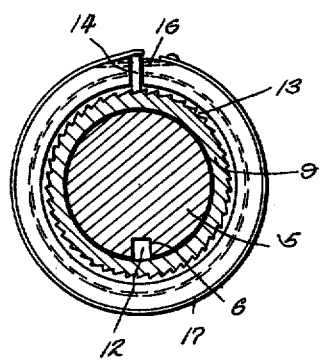
Fig. 2 is a transverse vertical sectional view upon line 2—2 of Fig. 1.
Figure 3:
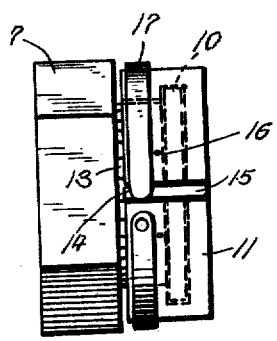
Fig. 3 is a side view of the nut and associated parts.

Referring to the drawing the numeral 5 designates a bolt which is of usual construction except that it has a longitudinal key way 6 formed therein. The nut 7 engages the threads 8 of the bolt to be screwed up thereon in the usual way. This nut is provided with a rearward tubular extension 9 which has an out-turned annular flange 10 at its rear end. A sliding follower 11 engages the flange 10 and this follower is held against turning with respect to the bolt by a lug 12 which engages in the key way 6. Thus the follower slides upon the bolt but does not turn with respect thereto and it is caused to travel longitudinally with the nut 7 by reason of the engagement of the flange 10 with said follower. Since the follower cannot turn upon the bolt, it is apparent that if means are provided for holding the nut against reverse movement with respect to the follower, said nut will likewise be held against reverse movement with respect to the bolt. This is accomplished by providing upon the rearward extension 9 a series of teeth 13 which teeth are adapted to be engaged by the nose 14 of a pivoted dog 15. This dog is mounted for pivotal movement upon a transverse pin 16 that is carried by the follower 11 and its nose 14 is forced downwardly into engagement with the teeth 13 by means of a band spring 17 which extends around the follower and frictionally grips the same and at one end presses upon the forward end of the pawl or dog 15 and tends to force the nose 14 of said dog into engagement with the teeth 13 as before stated. The shape of the teeth 13 is such as to permit right hand movement of the nut in screwing the nut into place upon the bolt and to prevent movement of the nut in the opposite direction. If it be desired to remove the nut 7 this may be accomplished by pressing upon the rear end of the pawl or dog 15 and rocking this dog upon its pivot 16 to lift the nose 14 of the dog out of engagement with the teeth 13.

It is to be understood that the invention is not limited to the precise construction set forth but that it includes within its purview whatever changes fairly come within either the terms or the spirit of the appended claims.

Having described my invention, what I claim is:

1. The combination with a bolt, of a nut adapted to be screwed thereon by a turning movement, a follower connected to the nut to move longitudinally therewith, means for holding said follower against turning with respect to the bolt and a pawl and ratchet mechanism between the follower and the nut.

2. In combination a bolt having a longitudinal key way formed therein and threaded for the reception of a nut, a nut adapted to be screwed thereon, a follower to which said nut is swiveled, an element upon the follower engaging the key way of the bolt and a pawl and ratchet mechanism between the nut and the follower.

3. In combination a bolt having a longitudinal key way therein, a nut threaded for engagement with the bolt, a rearward extension upon the nut, an outturned flange carried by said rearward extension, a follower engaging the flange of the extension to prevent separation of the follower and the nut while permitting rotation of the nut with respect to the follower, ratchet teeth carried by said rearward extension and a pawl pivoted to the follower and adapted to engage said ratchet teeth.

4. A structure as recited in claim 3 in combination with a band spring encircling said follower and having a part bearing upon said dog and tending to force said dog into engagement with the teeth.

In testimony whereof I affix my signature in the presence of two witnesses.

JOHN J. SAMMONS.

Witnesses:
 REES R. NATION,
 C. M. STAPF.